United States Patent [19]

O'Dea

[11] Patent Number: 5,696,794
[45] Date of Patent: Dec. 9, 1997

[54] METHOD AND APPARATUS FOR CONDITIONING DIGITALLY MODULATED SIGNALS USING CHANNEL SYMBOL ADJUSTMENT

[75] Inventor: Robert J. O'Dea, Ft. Lauderdale, Fla.

[73] Assignee: Motorola, Inc., Schaumburg, Ill.

[21] Appl. No.: 627,538

[22] Filed: Apr. 4, 1996

[51] Int. Cl.$^6$ .............................. H04L 1/00; H04L 27/20; H04L 27/36
[52] U.S. Cl. .......................... 375/296; 375/298; 375/308
[58] Field of Search .............................. 375/284, 285, 375/296, 298, 302, 308

[56] References Cited

U.S. PATENT DOCUMENTS

| | | | |
|---|---|---|---|
| 4,291,277 | 9/1981 | Davis et al. | 375/296 |
| 4,410,955 | 10/1983 | Burke et al. | 364/718 |
| 4,646,326 | 2/1987 | Backof, Jr. et al. | 375/261 |
| 5,093,637 | 3/1992 | Isota et al. | 375/296 |
| 5,204,881 | 4/1993 | Cardini et al. | 375/296 |
| 5,600,676 | 2/1997 | Ramesh | 375/308 |
| 5,621,762 | 4/1997 | Miller et al. | 375/298 |
| 5,629,961 | 5/1997 | Kawabata | 375/308 |

Primary Examiner—Stephen Chin
Assistant Examiner—Jeffrey W. Gluck
Attorney, Agent, or Firm—Andrew S. Fuller

[57] ABSTRACT

A digitally modulated signal is conditioned, such as to facilitate amplification (500). The digitally modulated signal is derived from a digital information stream which is mapped onto a symbol constellation to generate a sequence of channel symbols. From a signal envelope representing the sequence of channel symbols, signal envelope minimum values are determined for the signal envelope as it transitions through successive channel symbols of the sequence (510). A modified sequence of channel symbols is generated by adjusting at least some channel symbols of the sequence, preferably based on response characteristics of a spectral shaping filter, to avoid signal envelope minimum values below a threshold value, thereby conditioning the digitally modulated signal (515, 520, 530, 540, 545, 555).

27 Claims, 3 Drawing Sheets

METHOD AND APPARATUS FOR CONDITIONING DIGITALLY MODULATED SIGNALS USING CHANNEL SYMBOL ADJUSTMENT

TECHNICAL FIELD

This invention relates in general to digital communications, and more particularly, to the conditioning of a digitally modulated signal, such as for amplification purposes.

BACKGROUND

Contemporary communication systems often employ digital signals to effect communications. In a typical digital radio communication device, the transmitted source information is represented by a digital information stream. This digital information stream is modulated and amplified for transmission over a communication channel. Many complex digital modulation schemes have been developed to efficiently convey information across a communication channel. Depending on the digital modulation scheme used, a resultant transmitted signal may have a signal envelope with substantial variation or dynamic range. The dynamic range of the transmitted signal envelope affects the design and selection of a power amplifier used to amplify the communication signals before transmission.

Typically, the power amplifier must accommodate the variations in the signal envelope without distorting the transmitted signal. Distortion of the transmitted signal can cause undesirable effects, such as spectral spreading of the signal energy into adjacent communication channels and degradation to the receiver sensitivity. To avoid signal distortion, the power amplifier is designed to linearly amplify the transmitted signal over its complete dynamic range.

The operating characteristics of conventional power amplifiers dictate that the amplifier efficiency increases monotonically with the value of the signal envelope. A constant signal envelope modulation, such as frequency modulation (FM), allows a power amplifier to be designed to operate continuously at peak efficiency. However, when the value of the transmitted signal envelope varies with time, the overall amplifier efficiency will be significantly less than peak efficiency. In a battery powered communication device, this reduction in amplifier efficiency results in reduced battery life. Amplifiers that accommodate large signal dynamic ranges are also relatively expensive to develop and produce, when compared to amplifiers for constant signal envelope signals.

Known power amplification techniques such as Doherty, Supply Modulation, and LINC (linear amplification with nonlinear components), are designed to amplify signals having a varying signal envelope without distorting the signal, while simultaneously providing improved power efficiency. However, with these amplification techniques, it is expensive to accommodate signals with a large dynamic range while maintaining good performance. Consequently, use of a particular modulation scheme with a varying signal envelope may preclude the selection of certain amplifier designs because of cost and performance issues.

The reduction of power consumption has become an increasingly important aspect of the design of a radio communication device. The provision of an efficient power amplification for transmitted signals is a critical component in reducing power consumption. However, some modulation schemes used to maximize spectral efficiency may have 60 dB or more amplitude dynamic range, which limits the ability to use efficient amplification techniques. It is desirable to facilitate the efficient amplification of modulated signals while avoiding problems associated with prior art devices.

DETAILED DESCRIPTION OF THE PREFERRED EMBODIMENT

The present invention provides for the conditioning of a digitally modulated signal, such as to enhance amplifier performance in a transmitter. For digital modulation, a digital information stream is mapped onto a symbol constellation to generate a sequence of channel symbols. The sequence of channel symbols is processed, with respect to a signal envelope representing the sequence, by determining minimum values assumed by the signal envelope ("symbol interval minima"), as the signal envelope transitions through successive channel symbols of the sequence. A modified sequence of channel symbols is generated by adjusting characteristics of at least some of the channel symbols of the sequence to avoid symbol interval minima having values below a minimum threshold. In the preferred embodiment, channel symbols are adjusted by manipulating amplitude and/or phase of channel symbols that influence low symbol interval minima.

Figure 1:
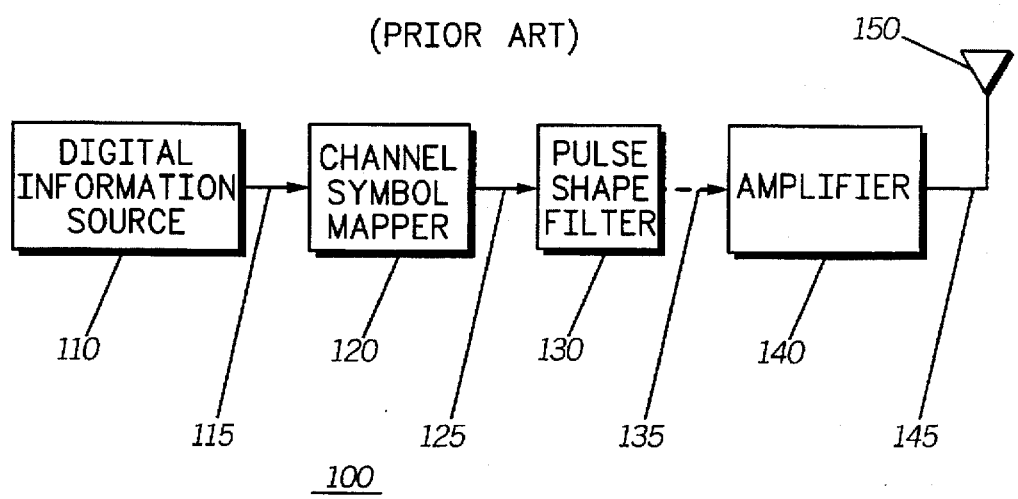
FIG. 1 is a block diagram of a portion of a prior art communication device, capable of transmitting digital information using a Quadrature Amplitude Modulation (QAM) signal.

Referring to FIG. 1, a prior art communication device 100 is shown, that incorporates elements commonly found in a device providing linear transmission of digitally modulated signals. The communication device 100 includes a digital information source 110, such as a voice encoder, that generates a stream of digital information 115. A channel symbol mapper 120 is coupled to the stream of information 115 and provides digital modulation. In the example shown, a linear modulation scheme such as Quadrature Amplitude Modulation (QAM) is used. The QAM signaling scheme utilizes both the phase and amplitude of a carrier signal to transmit information, and has a relatively high peak-to-average power ratio. The channel symbol mapper 120 outputs a modulated signal comprising a sequence of channel symbols 125, and the modulated signal is coupled to a pulse shape filter 130. The pulse shape filter 130 provides a bandwidth limiting function to limit the signal spectrum. The filter 130 outputs a digitally filtered signal 135 which is ultimately coupled to an amplifier 140. The amplifier 140 outputs an amplified signal 145 that is radiated through an antenna 150.

Figure 2:
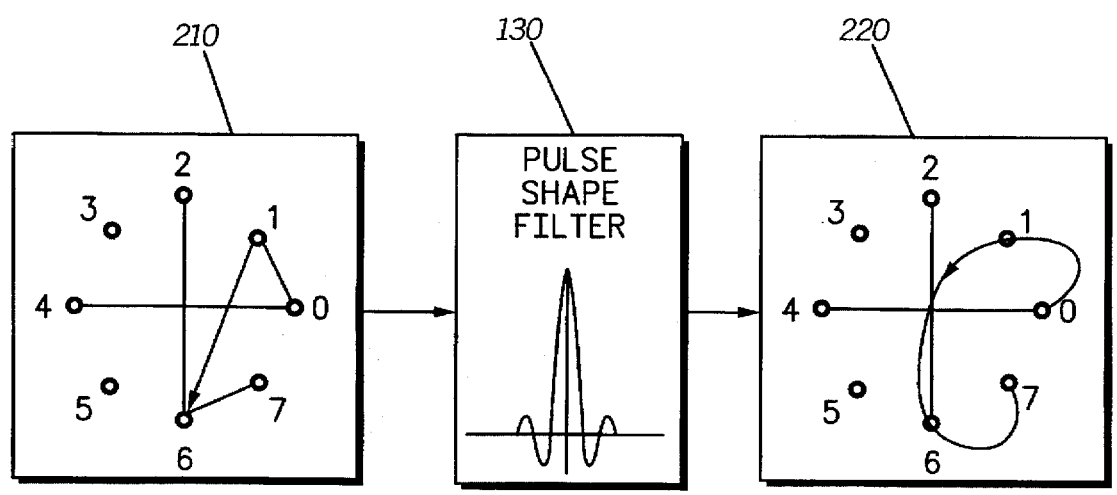
FIG. 2 is a diagram depicting the impact of pulse shape filtering on a QAM based digitally modulated signal, as processed by the prior art device of FIG. 1.

FIG. 2 shows a graphical representation 200 of the impact of the pulse shape filter in the prior art, on which, for purposes of illustration, it is assumed that a π/4 quadrature phase shift keying (QPSK) modulation scheme is employed. As is common in the art, a symbol constellation for a π/4 QPSK modulation scheme can be represented graphically as a set of symbols in a two-dimensional structure representing phase and amplitude. Graphical block 210 is a representation of a channel symbol sequence having values {0, 1, 6, 7} generated by the channel symbol mapper 120 to represent a sample digital information stream. Note that in this modulation scheme, straight line transitions between successive symbols do not cross the origin, i.e., no transition has a point at which the amplitude and phase have a value of zero(0).

Figure 3:
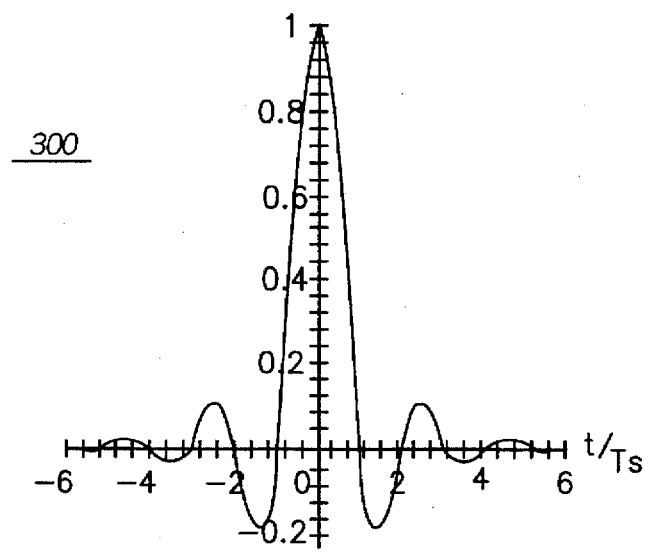
FIG. 3 is a graph depicting the time domain response of a pulse shape filter.

As in a typical implementation incorporating the π/4 QPSK modulation scheme, the filter 130 is a raised cosine rolloff pulse shape filter with a predetermined rolloff factor. FIG. 3 is a graph 300 showing a time domain response of the filter 130. The output of the filter 130 is expected to include superimposed responses of the filter to multiple channel symbols. Assume that the sequence of symbols has a symbol period $T_s$, representing the time between successive symbols. A pulse from the pulse shape filter crosses zero at multiples of the symbol period $T_s$, and the value of the composite signal at multiples of $T_s$ will be equal to the channel symbol corresponding to that symbol time. A minimum value of the signal envelope will occur between symbol transitions.

Graphical block 220 is a representation of the signal envelope or signal trajectory representing the sequence of channel symbols {0, 1, 6, 7} after being processed by the pulse shape filter 130. When pulse shape filtering is applied to the sequence of channel symbols to limit signal spectrum, certain symbol transitions can cause the signal envelope to have a very small value. This is primarily due to the characteristic ringing of the pulse shape filter, which causes the signal phase and amplitude, during symbol transitions, to be a function of multiple symbols. Thus, the straight transitions between channel symbols, as evidence in graph 210, are replaced by random non-linear transitions that produce extremely small signal envelope values. This impact of filtering increases as the filter rolloff factor or signal bandwidth is reduced.

In the example shown, the signal envelope for the symbol sequence {0, 1, 6, 7} takes a path that passes near the origin during the transition from channel symbol {1} to channel symbol {6}. Extremely small values of the signal envelope makes difficult the use of highly efficient linear amplification techniques such as supply modulation LINC and contribute to decoding errors when certain differential detection techniques are employed to process transmitted signals at a receiver.

For the purposes of this discussion, the portion of the signal envelope occurring during the transition between one channel symbol and a successive channel symbol is referred to herein as a symbol interval. A symbol interval minimum is defined, with respect to a particular symbol interval, as the minimum value of the signal envelope during the particular symbol interval. This minimum value is determined by the minimum distance from the origin to the trajectory of the signal envelope during the symbol interval.

According to the present invention, the modulated signal is processed or conditioned, preferably based on the impact of the spectral shaping filter used to filter the modulated signal, to avoid modulated signal envelope values below a particular minimum threshold. Such signal conditioning facilitates the use of efficient linear amplification techniques requiring a limited dynamic range.

Figure 4:
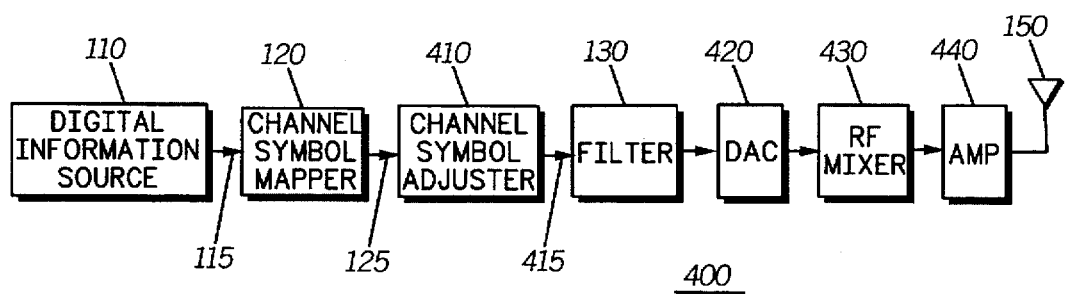
FIG. 4 is a block diagram of a digital linear transmitter in a communication device, the transmitter incorporating a channel symbol adjuster, in accordance with the present invention.

FIG. 4 is a block diagram of a transmitter portion of a digital communication device, in accordance with the present invention. As in the prior art device 100 (FIG. 1), the device 400 includes a digital information source 110, a channel symbol mapper 120, a filter 130, and an antenna 150, having all the functions as previously described. The device 400 further includes a digital-to-analog converter (DAC) 420, coupled to the output of the filter 130. A radio frequency (RF) mixer 430 is coupled at the output of the DAC 420, and a high efficiency linear amplifier 440, such as a LINC amplifier, coupled to the output of the RF mixer 430. The output of the amplifier 440 is coupled to the antenna 150.

In accordance with the present invention, the communication device includes a channel symbol adjuster 410, preferably interposed between the channel symbol mapper 120 and the filter 130. The channel symbol adjuster 410 conditions the sequence of channel symbols 125 generated at the channel symbol mapper 120, and produces a modified sequence of channel symbols 415 for input to the filter 130. In the preferred embodiment, the channel symbol adjuster 410 operates to adjust amplitude and/or phase of selected channel symbols of the sequence 125 representing the digitally modulated signal. Preferably, the adjustments are based in part on the expected response of the spectral shaping filter 130, which in the preferred embodiment is a raised cosine rolloff pulse shape filter.

Signal conditioning is performed to counter the impact of filtering on the signal envelope of the modulated signal. It can be shown that the magnitude of the portion of the signal envelope during transitions between channel symbols can be modified by adjusting the amplitude and/or phase of bordering channel symbols. For example, assume that a digital linear modulation signaling scheme uses a two-dimensional RF signaling format which can be written as:

$$s(t) = \sum_{k=-\infty}^{\infty} (x_k \cos(w_o t) - y_k \sin(w_o t)) p(t - kT_s)$$
$$= Re[d(t)\exp(jw_o t)]$$

where d(t) is the complex envelope of s(t) given by $$d(t) = \sum_{k=-\infty}^{\infty} d_k p(t - kT_s);$$

and where $d_k = x_k + jy_k$, p(t) is the pulse shape, $T_s$ is the symbol duration, and $x_k$ and $y_k$ are the in-phase(I) and quadrature(Q) components of the $k^{th}$ channel symbol $d_k$, respectively. The instantaneous signal magnitude in s(t), $P_s(t)$, can be expressed as:

$$P_S(t) = \left| \sum_{k=-\infty}^{\infty} d_k p(t - kT_s) \right| \leq \sum_{k=-\infty}^{\infty} |d_k| p(t - kT_s)$$

where the inequality becomes an equality if the channel symbols have phases that cause each term to add constructively. The summation need only include the symbols that contribute to the signal value at a given point. The number of symbols to be included in the summation is determined by the duration of the ringing in the pulse shape filter response. Note that the unique channel symbols $d_k$ are often illustrated by a two-dimensional symbol constellation in which the value of $x_k$ is plotted on an in-phase axis, and the value of $y_k$ is plotted on a quadrature axis. By varying $x_k$ and $y_k$ for a particular channel symbol $d_k$, the magnitude of the signal envelope about the particular channel symbol is affected.

Accordingly, the channel symbol adjuster 410 operates to adjust selected channel symbols that influence a signal envelope minimum value falling below a preselected threshold value, such that the representative signal envelope does not fall below the threshold value. In effect, the adjustments are made to the symbol coordinates, with respect to the symbol constellation, of the affected channel symbols.

Figure 5:
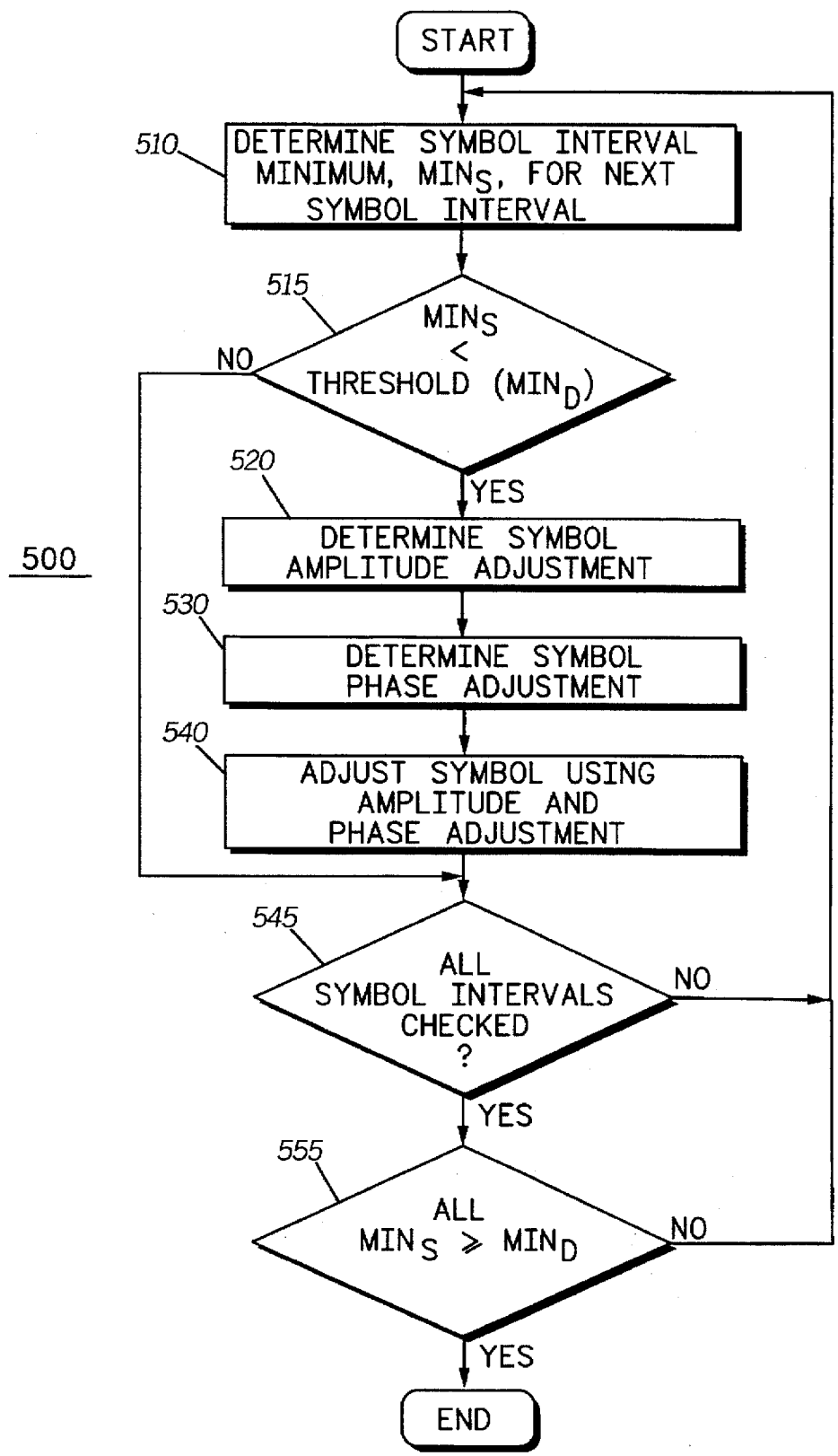
FIG. 5 is a flowchart of procedures for operating the channel symbol adjuster, in accordance with the present invention.

FIG. 5 is a flowchart of procedures 500 for operating a channel symbol adjuster, in accordance with the present invention. In summary, the digital information stream is first mapped onto a symbol constellation, such as by using a π/4 QPSK modulation scheme, to generate a sequence of channel symbols. The procedure then operates to determine, with respect to a signal envelope representing the sequence of channel symbols, minimum values for the signal envelope as it transitions between successive channel symbols of the sequence. A modified sequence of channel symbols is then generated by adjusting characteristics of at least some channel symbols of the sequence to avoid symbol interval minimas having values below a minima threshold.

The channel symbol adjuster determines a minimum value, $Min_s$, for the signal envelope during a particular symbol interval, i.e., a symbol interval minimum, step 510. Preferably, the symbol interval minima corresponds to a particular transition between first and second channel symbols occurring successively. When $Min_s$ is less than a particular minimum threshold, $Min_d$, step 515, an adjustment vector, for at least one adjacent symbol to the symbol interval minimum, is determined based on an expected response of the pulse shape filter, or other spectral shaping filter, that processes the sequence of channel symbols, steps 520, 530, 540. Preferably, the magnitude of the adjustment vector is generated based at least in part on a difference between the symbol interval minimum and the minimum threshold, step 520. In the preferred embodiment, the vector magnitude $M=(Min_d-Min_s)*(0.5/P_{mid})$, where $P_{mid}$ is a filter response characteristic corresponding to a symbol period midpoint, i.e., $P_{mid}$ is equal to the filter response at a time, $t=0.5T_s$.

The phase of the adjustment vector is determined based on the symbol phase, $Ph_s$, for the first channel symbol, and the signal phase rotation, $Ph_r$, corresponding to the signal envelope as it transitions between the first and second channel symbols, step 530. The vector phase, $Ph_{adj}$, is preferably calculated by the formula: $Ph_{adj}=Ph_s+Ph_r/2$. Preferably, the two channel symbols adjacent to or bordering the symbol interval minimum below the minimum threshold are adjusted with the adjustment, step 540.

All symbol intervals corresponding to the sequence of channel symbols are checked for symbol interval minimum less than the minimum threshold, and channel symbols adjacent to such symbol interval minima are adjusted. Additional processing may be performed on the channel symbol, such as to normalize channel symbol magnitudes to maintain average power of the signal. The entire process is repeated iteratively until there are no symbol interval minima less than the minimum threshold. This process in effect creates a "hole" around the origin for the signal envelope, i.e., there are no crossings at or near the origin by the signal envelope.

The algorithm employed by the channel symbol adjuster of the preferred embodiment can be summarized as follows:

1. Determine $Min_s$, on the $i^{th}$ symbol interval, i.e., between the $i^{th}$ and $(i+1)^{th}$ symbol.
2. If $Min_s$ is less than $Min_d$, then:
   (a) Set the adjustment magnitude $M=(Min_d-Min_s)*(0.5/P_{mid})$.
   (b) Determine the signal phase rotation $Ph_r$ on the $i^{th}$ symbol interval.
   (c) Determine the phase of the $i^{th}$ symbol $Ph_s$.
   (d) Set the adjustment phase $Ph_{adj}=Ph_s+Ph_r/2$.
   (e) Add a vector of magnitude M and phase $Ph_{adj}$ to the $i^{th}$ and $(i+1)^{th}$ symbols.
3. Repeat Steps 1 and 2 for all symbol intervals.
4. Normalize the channel symbol magnitudes to maintain average power.
5. Repeat steps 1, 2, 3, and 4 until no symbol interval minimum less than $Min_d$ is detected.

The functions of the above described procedure can be implemented in a digital signal processor by algorithm, such as in conjunction with a look-up table, with minimal impact on hardware design, modulation system design, and the like. Furthermore, there is negligible adverse impact on performance parameters such as signal transmission bandwidth.

Figure 6:
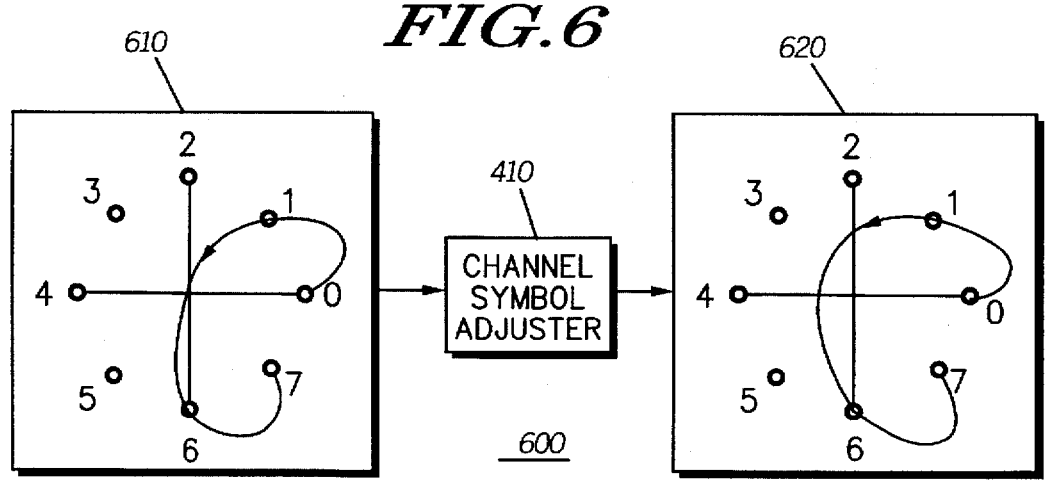
FIG. 6 is a diagram comparing the trajectory of a signal with and without the channel symbol adjuster, in accordance with the present invention.

FIG. 6 shows a block representation 600 of the transformation to the signal envelope after pulse shape filtering, when the channel symbol adjuster is used, in accordance with the present invention. Graph 610 shows a pulse shape filtered signal envelope transitioning through the symbol sequence {0, 1, 6, 7} when the channel symbol adjuster is not used. Graph 620 shows the pulse shaped filtered signal envelope transitioning through the same sequence of symbols {0, 1, 6, 7} when the channel symbol adjuster is used. From graph 610, it is seen that the signal envelope passes close to the origin when transitioning on the symbol interval {1, 6}. Hence, the minimum value of the signal envelope, i.e., the symbol interval minima, is close to zero for the symbol interval {1, 6}.

According to the present invention, the channel symbol adjuster adjusts characteristics of one or more channel symbols of the sequence to avoid symbol interval minima having values below a particular minimum threshold. In the preferred embodiment, when a symbol interval minimum is below a minimum threshold, the two symbols bordering the particular symbol interval minimum are adjusted. The adjustment is preferably split equally among the two bordering symbols to reduce the impact in decoding those symbols. The adjustments are made based on the response or expected response of the filter. In the example under discussion, amplitude and phase adjustments are made to symbol {1} and symbol {6}, such that the trajectory of the signal transitioning between both symbols avoids the origin by at least the minimum threshold amount.

The present invention provides a technique for removing extremely small signal envelope values for a filtered digitally modulated signal by adjusting characteristics of channel symbols, preferably prior to the application of spectral shaping filtering. In the preferred embodiment, channel symbols are modified by adjusting amplitude and/or phase. However, in an alternative embodiment, other characteristics such as channel symbol timing may be adjusted. While the discussion used the π/4 QPSK modulation scheme as an example, the concepts taught herein are equally applicable to other digital linear modulation schemes, and is not limited to any particular type of spectral shaping filter. Consider that the concepts could be applied to multiple channels or to a modulation scheme that utilizes multiple channels to transmit information. In such a system, the composite signal envelope can experience minimum values at or near symbol times, and the channel adjustment algorithm would be correspondingly modified to locate and adjust these minimum values.

The elimination of extremely small signal envelope minima provides significant benefits. For example, the use of the LINC power amplifier technique is facilitated by the creation of a signal envelope "hole" around the origin. This hole eliminates the need for extremely accurate phase resolution and reduces the bandwidth requirements in the LINC amplifier. In another example of a benefit, signal decoding is facilitated at a receiver processing a signal created according to the present invention. A phase discriminator detector typically utilized at the receiver is responsive to noise that can result in an error when the noise pushes the symbol transition to an opposite side of the origin. By moving the signal envelope away from the origin, the likelihood of this type of error is reduced.

What is claimed is:

1. A method of conditioning digitally modulated signals, comprising:

mapping a digital information stream onto a symbol constellation to generate a sequence of channel symbols;

determining, with respect to a signal envelope representing the sequence of channel symbols, signal envelope minimum values; and generating a modified sequence of channel symbols by adjusting characteristics of at least some channel symbols of the sequence to avoid signal envelope minimum values below a threshold value.

2. The method of claim 1, wherein the step of generating a modified sequence of channel symbols comprises the step of adjusting at least one of amplitude and phase for at least one channel symbol that influences a portion of the signal envelope having a signal envelope minimum value below the threshold value.

3. The method of claim 1, wherein the step of generating a modified sequence of channel symbols comprises the step of adjusting symbol coordinates, with respect to the symbol constellation, of at least one channel symbol that borders a portion of the signal envelope having a signal envelope minimum value below the threshold value.

4. The method of claim 1, wherein the step of generating a modified sequence of channel symbols comprises the steps of:

determining that a particular signal envelope minimum value corresponding to a portion of the signal envelope, during a transition between first and second channel symbols occurring successively, is below the threshold value;

generating an adjustment vector having a magnitude and phase based on a symbol phase for the first channel symbol, a signal phase rotation for the transition, and a difference between the particular signal envelope minimum value and the threshold value; and adjusting the first and second channel symbols based at least in part on the adjustment vector.

5. The method of claim 1, wherein the step of generating a modified sequence of channel symbols comprises the steps of:

(a) determining that a particular signal envelope minimum value, $Min_s$, corresponding to a particular transition between first and second channel symbols occurring successively in the sequence, is below the threshold value, $Min_d$;

(b) generating a magnitude adjustment, $M=(Min_d-Min_s)*(0.5/P_{mid})$, where $P_{mid}$ is a filter response characteristic corresponding to a symbol period midpoint;

(c) determining a signal phase rotation, $Ph_r$, for the particular transition;

(d) determining a phase, $Ph_s$, for the first channel symbol;

(e) generating a phase adjustment, $Ph_{adj}$, wherein $Ph_{adj}=Ph_s+Ph_r/2$; and (f) adding a vector, having a magnitude correspond to M and a phase corresponding to $Ph_{adj}$, to the first and second channel symbols, respectively.

6. The method of claim 5, wherein the step of generating a modified sequence of channel symbols further comprises the step of repeating steps (a) through (f) for all transitions between successive channel symbols of the sequence.

7. The method of claim 6, wherein the step of generating a modified sequence of channel symbols further comprises the step of, (g) normalizing symbol magnitudes to maintain a particular average power level.

8. The method of claim 7, wherein the step of generating a modified sequence of channel symbols further comprises the step of repeating steps (a) through (g) for all transitions between successive channel symbols of the sequence until the signal envelope minimum values all exceed the threshold value.

9. The method of claim 1, wherein the modified sequence of channel symbols is based at least in part on response characteristics of a spectral shaping filter.

10. The method of claim 9, further comprising the step of processing the modified sequence of channel symbols with the spectral shaping filter.

11. The method of claim 1, wherein the symbol constellation corresponds to a π/4 Quadrature Phase Shift Keying modulation scheme.

12. A transmitter, comprising:

a digital information source providing a digital information signal;

a channel symbol mapper coupled to digital information source, and being responsive to the digital information signal to generate a stream of channel symbols according to a symbol constellation; and a channel symbol adjuster responsive to the stream of channel symbols to adjust selected channel symbols to avoid, with respect to a signal envelope representing the sequence of channel symbols, signal envelope minimum values below a minimum threshold, during transitions of the signal envelope between pairs of successive channel symbols, thereby providing a modified stream of channel symbols.

13. The transmitter of claim 12, wherein each channel symbol has a particular phase and amplitude, and the channel symbol adjuster adjusts the phase and amplitude of selected channel symbols until all signal envelope minimum values exceed the minimum threshold.

14. The transmitter of claim 12, wherein the channel symbol adjuster selectively adjusts pairs of adjacent channel symbols when avoiding signal envelope minimum values below the minimum threshold.

15. The transmitter of claim 14, wherein the channel symbol adjuster operates to select first and second channel symbols, occurring successively, that border a portion of the signal envelope having a minimum value, $Min_s$, below the minimum threshold, $Min_d$, and operates to add to the first and second channel symbols, a vector of magnitude M and phase $Ph_{adj}$, where:

$M=(Min_d-Min_s)*(0.5/P_{mid})$;

$Ph_{adj}=Ph_s+Ph_r/2$;

$P_{mid}$ is a pulse shape filter response value corresponding to a midpoint between the first and second channel symbols;

$Ph_r$ is a signal phase rotation value when the signal envelope transitions between the first and second channel symbols; and $Ph_s$ is a phase value for the first channel symbol.

16. The transmitter of claim 12, further comprising a spectral shaping filter responsive to the modified stream of channel symbols to generate a filtered symbol sequence.

17. The transmitter of claim 16, wherein the channel symbol adjuster operates based at least in part on characteristics of the spectral shaping filter.

18. The transmitter of claim 12, wherein the symbol constellation corresponds to a π/4 QPSK modulation scheme.

19. A method for processing a digital information stream in a digital transmitter that includes a spectral shaping filter, comprising the steps of:

mapping the digital information stream onto a symbol constellation to generate a sequence of symbols;

determining, with respect to a signal envelope representing the sequence of symbols, signal envelope minimum values for symbol intervals corresponding to transitions of the signal envelope between adjacent symbols of the sequence;

adjusting characteristics of the adjacent symbols, based at least in part on response characteristics of the spectral shaping filter, to avoid signal envelope minimum values below a threshold value, thereby generating a modified sequence of symbols;

processing the modified sequence of symbols with the spectral shaping filter to generate a filtered signal; and coupling the filtered signal to an amplifier.

20. The method of claim 19, wherein the step of adjusting characteristics comprises the step of adjusting at least one of amplitude and phase for at least one channel symbol that influences a portion of the signal envelope having a signal envelope minimum value below the threshold value.

21. The method of claim 19, wherein the step of adjusting characteristics comprises the steps of:

determining that a particular signal envelope minimum value corresponding to a portion of the signal envelope, during a transition between first and second channel symbols occurring successively, is below the threshold value;

generating an adjustment vector having a magnitude and phase based on a symbol phase for the first channel symbol, a signal phase rotation for the transition, and a difference between the particular signal envelope minimum value and the threshold value; and adjusting the first and second channel symbols based at least in part on the adjustment vector.

22. The method of claim 19, wherein the step of adjusting characteristics comprises the steps of:

(a) determining that a particular signal envelope minimum value, $Min_s$, corresponding to a particular transition between first and second channel symbols occurring successively in the sequence, is below the threshold value, $Min_d$;

(b) generating a magnitude adjustment, $M=(Min_d-Min_s)*(0.5/P_{mid})$, where $P_{mid}$ is a filter response characteristic corresponding to a symbol period midpoint;

(c) determining a signal phase rotation, $Ph_r$, for the particular transition;

(d) determining a phase, $Ph_s$, for the first channel symbol;

(e) generating a phase adjustment, $Ph_{adj}$, wherein $Ph_{adj}=Ph_s+Ph_r/2$; and (f) adding a vector, having a magnitude correspond to M and a phase corresponding to $Ph_{adj}$, to the first and second channel symbols, respectively.

23. A transmitter, comprising:

a digital information source providing a digital information signal;

a channel symbol mapper coupled to digital information source, and being responsive to the digital information signal to generate a stream of channel symbols according to a symbol constellation;

a channel symbol adjuster having an input of the stream of channel symbols, and an output of a modified stream of channel symbols, the channel symbol adjuster selectively operating to adjust particular channel symbols to avoid, with respect to a signal envelope representing the stream of channel symbols, signal envelope minimum values below a minimum threshold, during transitions of the signal envelope between successive channel symbols;

a spectral shaping filter responsive to the modified stream of channel symbols and having an output of a filtered signal; and an amplifier coupled to the output of the spectral shaping filter, and providing an amplified signal;

wherein the channel symbol adjuster operates based at least in part on characteristics of the spectral shaping filter.

24. The transmitter of claim 23, wherein the channel symbol adjuster selectively adjusts a phase characteristic of a particular channel symbol.

25. The transmitter of claim 23, wherein the channel symbol adjuster selectively adjusts an amplitude characteristic of a particular channel symbol.

26. The transmitter of claim 23, wherein the channel symbol adjuster operates to select first and second channel symbols, occurring successively, that border a portion of the signal envelope having a minimum value, $Min_s$, below the minimum threshold, $Min_d$, and operates to add to the first and second channel symbols, a vector of magnitude M and phase $Ph_{adj}$, where:

$M=(Min_d-Min_s)*(0.5/P_{mid})$;

$Ph_{adj}=Ph_s+Ph_r/2$;

$P_{mid}$ is a pulse shape filter response value corresponding to a midpoint between the first and second channel symbols;

$Ph_r$ is a signal phase rotation value when the signal envelope transitions between the first and second channel symbols; and $Ph_s$ is a phase value for the first channel symbol.

27. The transmitter of claim 23, wherein the symbol constellation corresponds to a π/4 QPSK modulation scheme.

* * * * *